US009991726B2

(12) United States Patent
Small, Jr.

(10) Patent No.: US 9,991,726 B2
(45) Date of Patent: Jun. 5, 2018

(54) RAPID BATTERY CHARGING

(71) Applicant: POTENTIAL DIFERENCE, INC., Las Vegas, NV (US)

(72) Inventor: Elliott C. Small, Jr., Las Vegas, NV (US)

(73) Assignee: Potential Difference, Inc., Las Vegas, NV (US)

( * ) Notice: Subject to any disclaimer, the term of this patent is extended or adjusted under 35 U.S.C. 154(b) by 128 days.

(21) Appl. No.: 14/993,875

(22) Filed: Jan. 12, 2016

(65) Prior Publication Data

US 2016/0204624 A1 Jul. 14, 2016

Related U.S. Application Data

(60) Provisional application No. 62/102,497, filed on Jan. 12, 2015.

(51) Int. Cl.
*H02J 7/00* (2006.01)

(52) U.S. Cl.
CPC .......... *H02J 7/0052* (2013.01); *H02J 7/0013* (2013.01); *H02J 7/0021* (2013.01); *H02J 7/0024* (2013.01); *H02J 7/0072* (2013.01); *H02J 2007/0059* (2013.01)

(58) Field of Classification Search
CPC ....................................................... H02J 7/007
USPC ............................................................ 320/139
See application file for complete search history.

(56) References Cited

U.S. PATENT DOCUMENTS

| 5,726,551 | A | * | 3/1998 | Miyazaki | ............ | B60L 11/1803 |
| | | | | | | 320/104 |
| 6,094,033 | A | * | 7/2000 | Ding | ..................... | H01M 10/44 |
| | | | | | | 320/132 |
| 6,229,285 | B1 | * | 5/2001 | Ding | ..................... | H01M 10/44 |
| | | | | | | 320/132 |
| 6,232,750 | B1 | * | 5/2001 | Podrazhansky | ....... | H02J 7/0093 |
| | | | | | | 320/139 |
| 6,841,974 | B2 | * | 1/2005 | Dykeman | ............. | H02J 7/0093 |
| | | | | | | 320/141 |
| 6,885,169 | B2 | * | 4/2005 | Dobbie | ................. | H02J 7/0093 |
| | | | | | | 320/141 |
| 8,368,357 | B2 | | 2/2013 | Ghantous et al. | | |
| 8,427,112 | B2 | | 4/2013 | Ghantous et al. | | |
| 8,513,921 | B2 | | 8/2013 | Berkowitz et al. | | |

(Continued)

*Primary Examiner* — Samuel Berhanu
*Assistant Examiner* — Tessema Kebede
(74) *Attorney, Agent, or Firm* — Daniel J. Chalker; Chalker Flores, LLP

(57) ABSTRACT

A method and battery charger for charging two or more batteries includes a pulse generator, a detector and a processor communicably coupled to the pulse generator and the detector. A charging series time period, a charging time period and a rest time period are determined based on one or more battery parameters using the processor and the detector. The charging time period is approximately equal to the charging series time period divided by the number of batteries and the rest time period is approximately equal to the charging series time period minus the charging time period. A charging pulse group having a positive pulse for the charging time period and a rest period for the rest time period is generated using the pulse generator, and sequentially applied to each of the batteries. The battery parameters are monitored and the charging pulse group may be adjusted.

28 Claims, 5 Drawing Sheets

(56) References Cited

U.S. PATENT DOCUMENTS

| | | |
|---|---|---|
| 8,638,070 B2 | 1/2014 | Maluf et al. |
| 8,791,669 B2 | 7/2014 | Ghantous et al. |
| 8,901,886 B2 | 12/2014 | Berkowitz et al. |
| 8,907,631 B1 | 12/2014 | Gurries et al. |

* cited by examiner

RAPID BATTERY CHARGING

CROSS REFERENCE TO RELATED APPLICATIONS

This application claims benefit of U.S. patent application Ser. No. 62/102,497, filed on Jan. 12, 2015, entitled "Rapid Battery Charging" and is related to U.S. patent application Ser. No. 13/869,986 entitled "Method for Simultaneously Charging Multiple Batteries" filed on Apr. 25, 2013, and 61/637,868 entitled "Method for Simultaneously Charging Multiple Batteries" filed on Apr. 25, 2012, the entire contents of which are hereby incorporated by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

FIELD OF THE INVENTION

This disclosure relates in general to battery charging systems.

BACKGROUND ART

Users of battery chargers can benefit from the ability to charge more than one battery simultaneously without dividing the size of the current among the batteries. Examples of existing charging methods are described in U.S. Pat. Nos. 6,094,033 and 6,229,285, the entire contents of which are hereby incorporated by reference in their entirety.

BRIEF SUMMARY OF THE INVENTION

As illustrated and described herein, the present invention provides efficient and faster charging of a wide range of batteries, from consumer electronics to vehicles, by reducing heat generating charge acceptance problems. In general, the present invention divides the charge into a regularly repeated series of actions that are sequentially applied to two or more batteries. These series of actions may include a charge pulse followed by a rest period, or a charge pulse followed by a rest period and a discharge pulse, or a discharge pulse followed by a rest period, a charge pulse and a rest period, etc.

For example, one embodiment of the present invention provides a method for charging two or more batteries with a battery charger that provides a number of batteries (two or more) electrically connected to the battery charger. The battery charger includes a pulse generator, a detector and a processor communicably coupled to the pulse generator and the detector. A charging series time period, a charging time period and a rest time period are determined based on one or more battery parameters using the processor and the detector. The charging time period is approximately equal to the charging series time period divided by the number of batteries and the rest time period is approximately equal to the charging series time period minus the charging time period. A charging pulse group having a positive pulse for the charging time period and a rest period for the rest time period is generated using the pulse generator. The charging pulse group is sequentially applied to each of the two or more batteries. The one or more parameters for the two or more batteries are monitored and a determination is made whether to adjust the charging pulse group for the two or more batteries using the processor and the detector.

Another embodiment of the present invention provides a method for charging two or more batteries with a battery charger that provides a number of batteries (two or more) electrically connected to the battery charger. The battery charger includes a pulse generator, a detector and a processor communicably coupled to the pulse generator and the detector. One or more parameters for the two or more batteries are measured. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. A charging series time period, a charging time period and a rest time period are determined based on one or more battery parameters using the processor and the detector. The charging time period is approximately equal to the charging series time period divided by the number of batteries and the rest time period is approximately equal to the charging series time period minus the charging time period. A charging pulse group having a positive pulse for the charging time period and a rest period for the rest time period is generated using the pulse generator. The charging pulse group is sequentially applied to each of the two or more batteries. The one or more parameters for the two or more batteries are monitored. The charging pulse group is adjusted whenever the processor determines that an adjustment is required by changing at least one of a voltage, a current, the charging series time period, the charging time period, the rest time period, the positive pulse and the rest period. The generating step, the sequentially applying step, the monitoring step and the adjusting step are repeated until the two or more batteries are substantially charged, a specified charge level is obtained, or a specified charging time period has elapsed.

Yet another embodiment of the present invention provides a battery charger for two or more batteries that includes a pulse generator, a detector and a processor communicably coupled to the pulse generator and the detector. The pulse generator is configured to generate a charging pulse group having a positive pulse for a charging time period and a rest period for a rest time period and sequentially apply the charging pulse group to each of the two or more batteries. The detector is configured to monitor one or more parameters for the two or more batteries. The processor is configured to determine the charging series time period. The charging time period and the rest time period are based on the one or more battery parameters, wherein the charging time period is approximately equal to the charging series time period divided by a number of batteries (the two or more batteries) and the rest time period is approximately equal to the charging series time period minus the charging time period. The processor is further configured to determine whether to adjust the charging pulse group for the two or more batteries.

The present invention also provides a method for charging two or more cells within a battery with a battery charger by providing the battery having a number of cells electrically connected to the battery charger, determining a charging series time period, a charging time period and a rest time period based on one or more cell parameters using the processor and the detector, generating a charging pulse group having a positive pulse for the charging time period and a rest period for the rest time period using the pulse generator, sequentially applying the charging pulse group to each of the two or more cells, and monitoring the one or more parameters for the two or more cells and determining whether to adjust the charging pulse group for the two or more cells using the processor and the detector. The number of cells includes the two or more cells, and the battery charger includes a pulse generator, a detector and a processor communicably coupled to the pulse generator and the detector. The charging time period is approximately equal to the charging series time period divided by the number of cells and the rest time period is approximately equal to the charging series time period minus the charging time period.

In addition, the present invention provides a battery charger for two or more cells within a battery that includes a pulse generator configured to generate a charging pulse group having a positive pulse for a charging time period and a rest period for a rest time period and sequentially apply the charging pulse group to each of the two or more cells, a detector configured to monitor one or more parameters for the two or more batteries, and a processor communicably coupled to the pulse generator and the detector. The processor is configured to determine the charging series time period, the charging time period and the rest time period based on the one or more cell parameters, wherein the charging time period is approximately equal to the charging series time period divided by a number of cells comprising the two or more cells and the rest time period is approximately equal to the charging series time period minus the charging time period. The processor is further configured to determine whether to adjust the charging pulse group for the two or more cells.

Technical advantages of certain embodiments will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE SEVERAL VIEWS OF THE DRAWINGS

For a more complete understanding of the present disclosure and its advantages, reference is now made to the following description, taken in conjunction with the accompanying drawings, in which.

DETAILED DESCRIPTION OF THE INVENTION

As illustrated and described herein, the present invention provides efficient and faster charging of a wide range of batteries or cells within a battery, from consumer electronics to vehicles, by reducing heat generating charge acceptance problems. In general, the present invention divides the charge into a regularly repeated series of actions that are sequentially applied to two or more batteries. These series of actions may include a charge pulse followed by a rest period, or a charge pulse followed by a rest period and a discharge pulse, or a discharge pulse followed by a rest period, a charge pulse and a rest period, etc. Note that the following disclosure provides various examples of the present invention and is not intended to limit the scope and applicability of the present invention.

With electrochemical polarization, there are more ions at one electrode than the other. One embodiment of the present invention provides opportunities for the ions to disperse evenly on an ongoing basis during the charge. With concentration polarization, the electrolyte has a higher concentration at one electrode than the other. One embodiment of the present invention forces the concentration to move alternately from one electrode to the other throughout the charge, dramatically reducing polarization. Key battery parameters are continually monitored during the charging process, and from that feedback, the parameters of the algorithm are adjusted on an ongoing basis.

Figure 1:
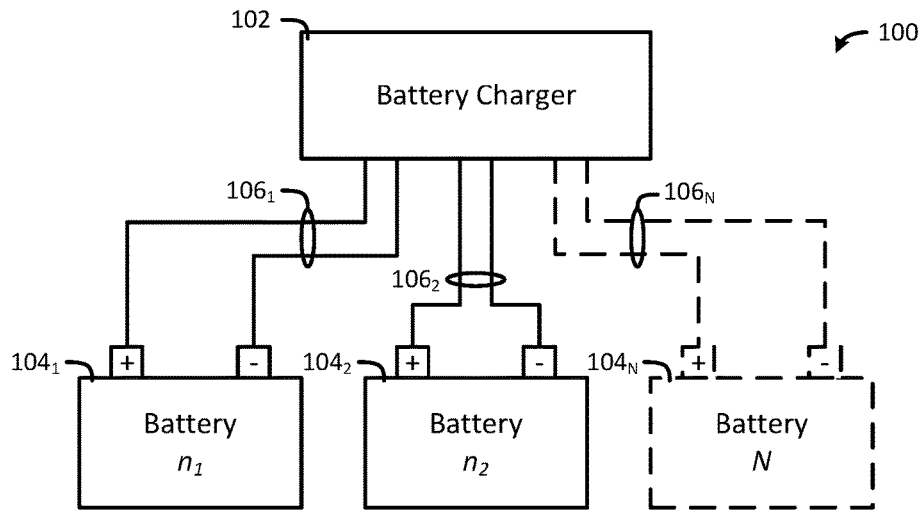
FIG. 1 is a block diagram of a charging system in accordance with one embodiment of the present invention.

Now referring to FIG. 1, a charging system 100 in accordance with one embodiment of the present invention is shown. The battery charger 102 is electrically connected to a number of batteries (N) where N>=2, represented by battery $n_1$, battery $n_2$ and battery N. The batteries $104_1$, $104_2$ and $104_N$ can be electrically connected to the battery charger 102 by any suitable means $106_1$, $106_2$ and $106_N$, such as wires, leads, plugs, etc. The battery charger 102 will be described in more detail below.

One embodiment of the present invention provides that when the charge period uses less than half of the time used by the full series of actions, the full power of the charging algorithm can be applied to more than one battery by applying the charge to one battery while the other actions are applied to another battery while continually alternating the charge and other actions between the batteries.

Figure 2:
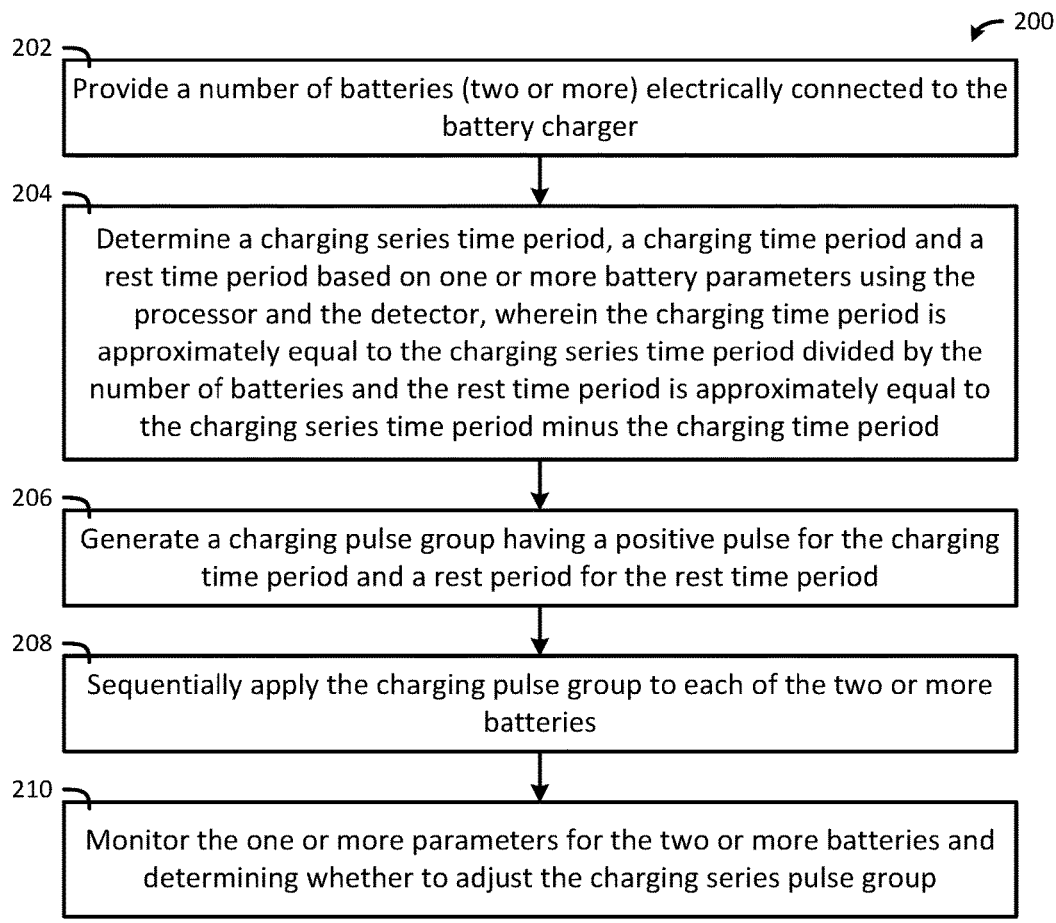
FIG. 2 is a flow chart of a method for charging two or more batteries with a battery charger in accordance with one embodiment of the present invention.

Referring now to FIG. 2, a method 200 for charging two or more batteries with a battery charger is shown. A number of batteries electrically connected to the battery charger are provided in block 202. The number of batteries is equal to or greater than two. The battery charger includes a pulse generator, a detector and a processor communicably coupled to the pulse generator and the detector (See e.g., FIG. 8). A charging series time period, a charging time period and a rest time period are determined based on one or more battery parameters using the processor and the detector in block 204. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. The charging time period is approximately equal to the charging series time period divided by the number of batteries and the rest time period is approximately equal to the charging series time period minus the charging time period. A charging pulse group having a positive pulse for the charging time period and a rest period for the rest time period is generated using the pulse generator in block 206. The charging pulse group is sequentially applied to each of the two or more batteries in block 208. The one or more parameters for the two or more batteries are monitored followed by a determination of whether to adjust the charging pulse group in block 210 using the processor and the detector. The adjustments to the charging pulse group may include changing at least one of a voltage, a current, the charging series time period, the charging time period, the rest time period, the positive pulse, the rest period, or other parameters. Note that the adjustments can be performed on each battery such that the charging pulse group includes a first charging pulse group for a first battery and a second charging pulse group for a second battery. The generating step 206, sequentially applying step 208, monitoring step 210 and the adjusting step are typically repeated until the two or more batteries are substantially charged, a specified charge level is obtained, or a specified charging time period has elapsed.

The step of providing the number of batteries electrically connected to the battery charger (step 202) may include the step of electrically connecting the two or more batteries to the battery charger. The method 200 may also include the steps of generating a discharge pulse using the pulse generator, applying the discharge pulse to each of the two or more batteries, and detecting the one or more battery parameters using the detector. Moreover, the method 200 may include the step of measuring the one or more parameters for the two or more batteries. As will be described below, the step of generating the charging pulse group may further include a negative or discharge pulse during the rest time period.

Figure 3:
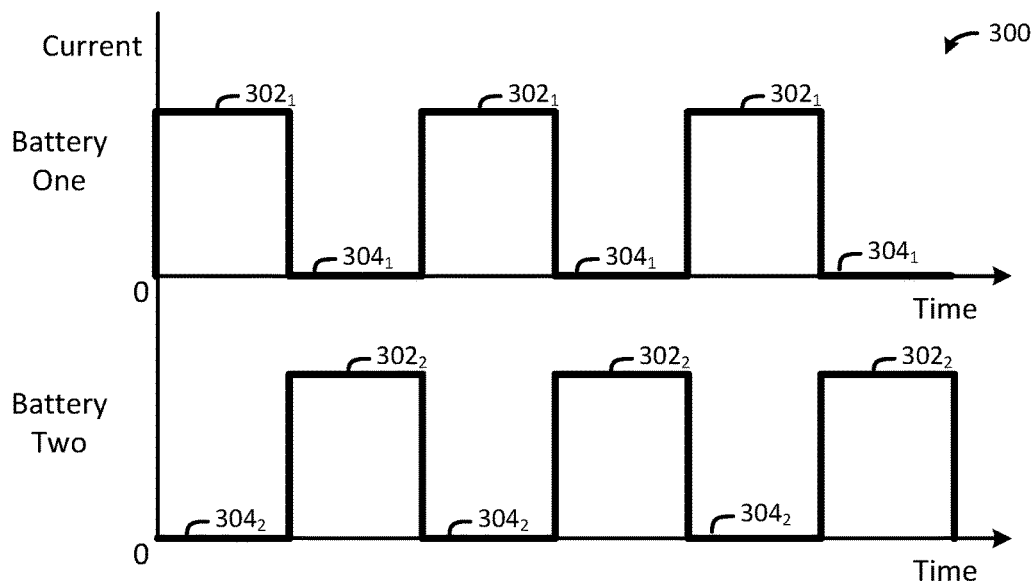
FIG. 3 is a diagram showing a charging pulse group for two batteries in accordance with one embodiment of the present invention.

Now referring to FIG. 3, one example of a charging pulse group 300 for two batteries is shown. The implementation follows a regularly repeated series of a charge pulse for 0.5 seconds ($302_1$ for battery one and $302_2$ for battery two) and a rest period for 0.5 seconds ($304_1$ for battery one and $304_2$ for battery two). In this case the method is able to deliver the full charge normally provided by this pulsed charge to two batteries simultaneously as shown below using the first three seconds of charge as an example:

| Elapsed Time | Battery 1 | | Battery 2 | |
|---|---|---|---|---|
| (seconds) | Charge Pulse | Rest Period | Charge Period | Rest Period |
| 0.5 | 0.5 sec. | | | |
| 1.0 | | 0.5 sec. | 0.5 sec. | |
| 1.5 | 0.5 sec. | | | 0.5 sec. |
| 2.0 | | 0.5 sec. | 0.5 sec. | |
| 2.5 | 0.5 sec. | | | 0.5 sec. |
| 3.0 | | 0.5 sec. | 0.5 sec. | |

Note that the 0.5 and 1.0 second time periods are merely examples and are not intended to limit the scope of the invention. Any suitable time period can be used based on the parameters of the batteries and the battery charger.

If the charging algorithm included a shorter charge pulse that is not more than one third of the length of the series, the method would enable the simultaneous full charge of three batteries. The possible number of batteries simultaneously charged is rounded down whole number resulting from the time length of the series of actions divided by the time length of the charge pulse.

Figure 4:
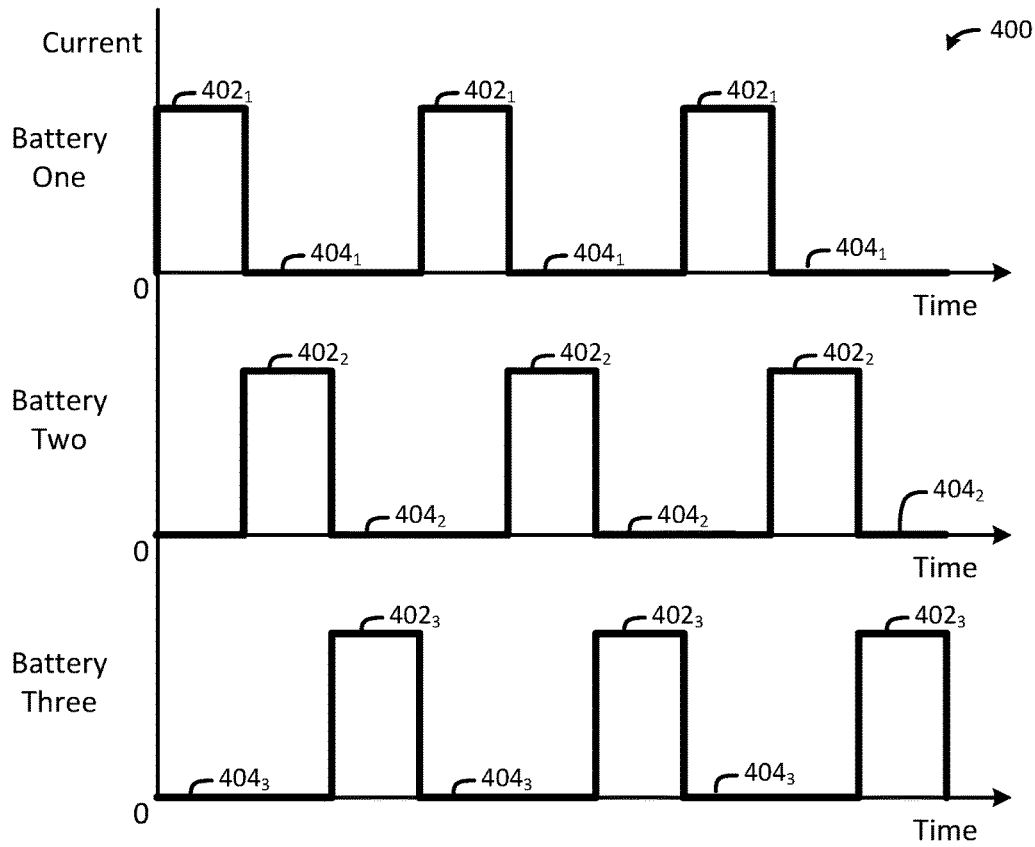
FIG. 4 is a diagram showing a charging pulse group for three batteries in accordance with one embodiment of the present invention and FIG. 5 is a diagram showing a charging pulse group for two batteries in accordance with another embodiment of the present invention.

Referring now to FIG. 4, one example of a charging pulse group 400 for three batteries is shown. The implementation follows a regularly repeated series of a charge pulse for 0.33 (⅓) seconds ($402_1$ for battery one, and $402_2$ for battery two and $402_3$ for battery three) and a rest period for 0.67 (⅔) seconds ($404_1$ for battery one, $404_2$ for battery two, and $404_3$ for battery three). In this case, the method is able to deliver the full charge normally provided by this pulsed charge to three batteries simultaneously as shown below using the first three seconds of charge as an example. For example, using the same elapsed time:

| Elapsed Time (seconds) | Battery 1 | | Battery 2 | | Battery 3 | |
|---|---|---|---|---|---|---|
| | Charge Pulse | Rest Period | Charge Period | Rest Period | Charge Period | Rest Period |
| 0.33 | 0.33 sec. | | | | | |
| 0.67 | | 0.33 sec. | 0.33 sec. | | | |
| 1.00 | | 0.33 sec. | | 0.33 sec. | 0.33 sec. | |
| 1.33 | 0.33 sec. | | | 0.33 sec. | | 0.33 sec. |
| 1.67 | | 0.33 sec. | 0.33 sec. | | | 0.33 sec. |
| 2.00 | | 0.33 sec. | | 0.33 sec. | 0.33 sec. | |
| 2.33 | 0.33 sec. | | | 0.33 sec. | | 0.33 sec. |
| 2.67 | | 0.33 sec. | 0.33 sec. | | | 0.33 sec. |
| 3.00 | | 0.33 sec. | | 0.33 sec. | 0.33 sec. | |

Note that the 0.33 (⅓), 0.67 (⅔) and 1.0 second time periods are merely examples and are not intended to limit the scope of the invention. Any suitable time period can be used based on the parameters of the batteries and the battery charger.

Figure 5:
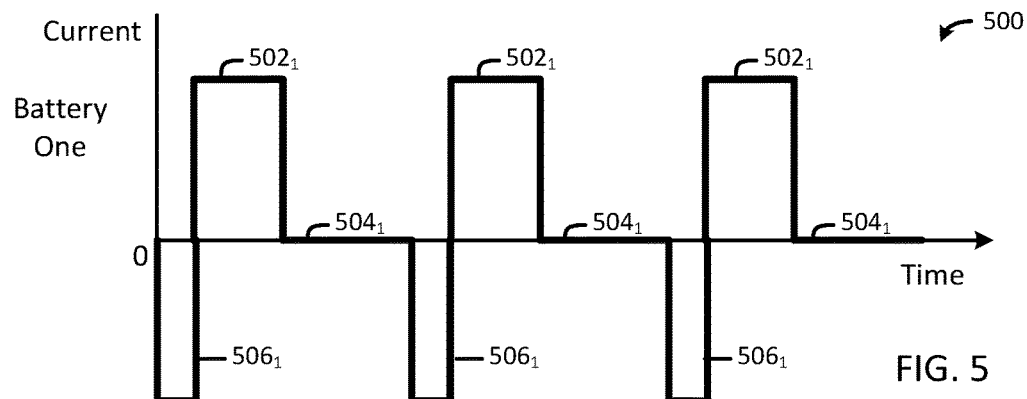
Figure 5:
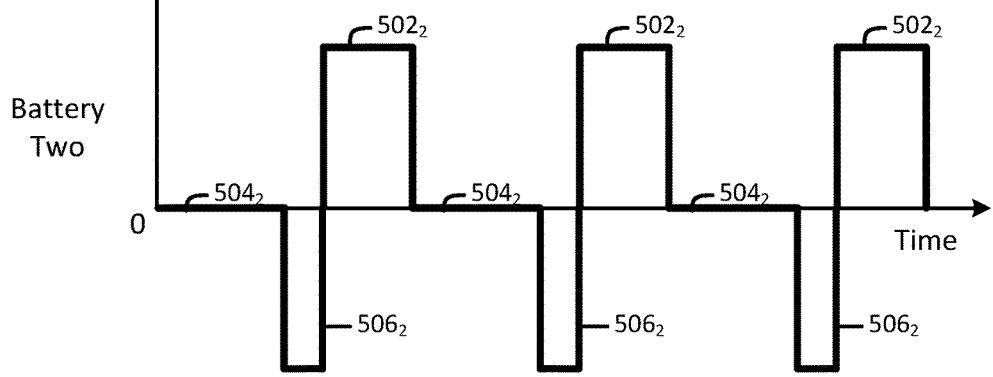

Now referring to FIG. 5, another example of a charging pulse group 500 for two batteries is shown. The implementation follows a regularly repeated series of a discharge or negative pulse ($506_1$ for battery one and $506_2$ for battery two), a charge pulse ($502_1$ for battery one and $502_2$ for battery two) and a rest period ($504_1$ for battery one and $504_2$ for battery two). In this example, the discharge or negative pulse 506 immediately precedes the charge pulse 504. Note also that the time periods and pulse magnitudes shown are merely examples and are not intended to limit the scope of the invention. For example, the magnitude of the discharge or negative pulse 506 may be less than the magnitude of the charge pulse 502. Any suitable time period and pulse magnitude can be used based on the parameters of the batteries and the battery charger.

Figure 6:
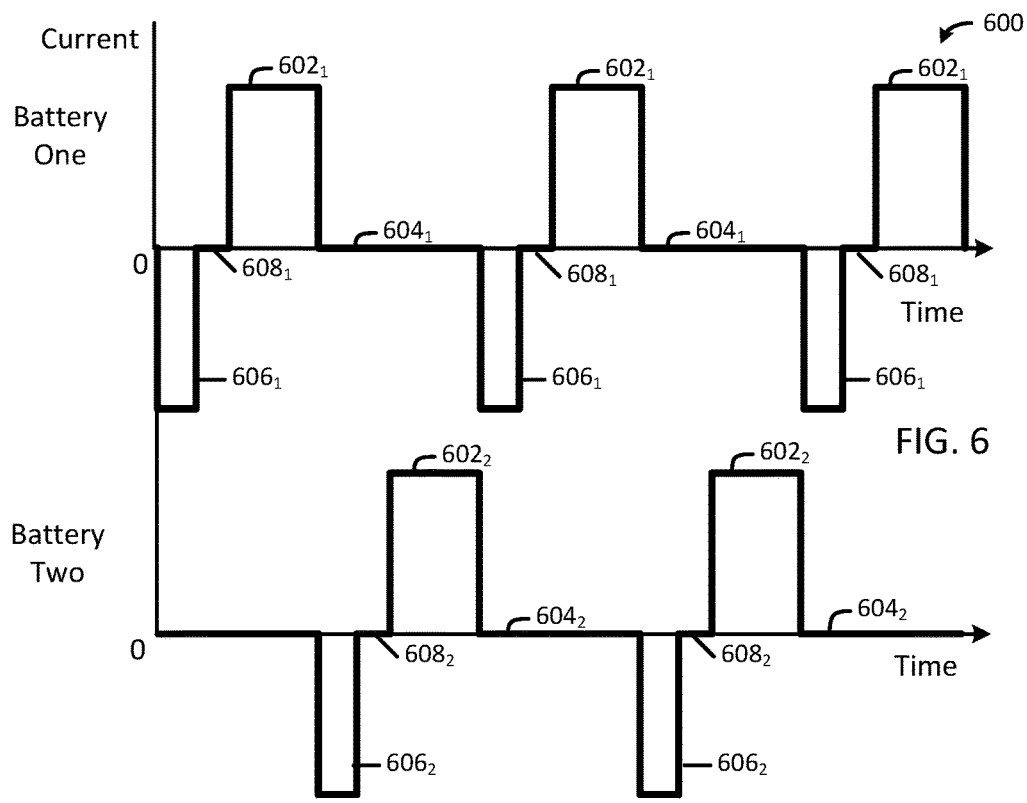
FIG. 6 is a diagram showing a charging pulse group for two batteries in accordance with another embodiment of the present invention.

Referring now to FIG. 6, yet another example of a charging pulse group 600 for two batteries is shown. The implementation follows a regularly repeated series of a discharge pulse ($606_1$ for battery one and $606_2$ for battery two), a charge pulse ($602_1$ for battery one and $602_2$ for battery two) and a rest period that has two portions, a first portion ($604_1$ for battery one and $604_2$ for battery two) that immediately follows the charge pulse 602 and a second portion ($608_1$ for battery one and $608_2$ for battery two) that immediately precedes the charge pulse 602. In this example, the discharge pulse 606 does not immediately follow the charge pulse 602 and does not immediately precede the charge pulse 602. Note also that the time periods and pulse magnitudes shown are merely examples and are not intended to limit the scope of the invention. For example, the magnitude of the discharge or negative pulse 606 may be less than the magnitude of the charge pulse 602. Any suitable time period and pulse magnitude can be used based on the parameters of the batteries and the battery charger.

Figure 7:
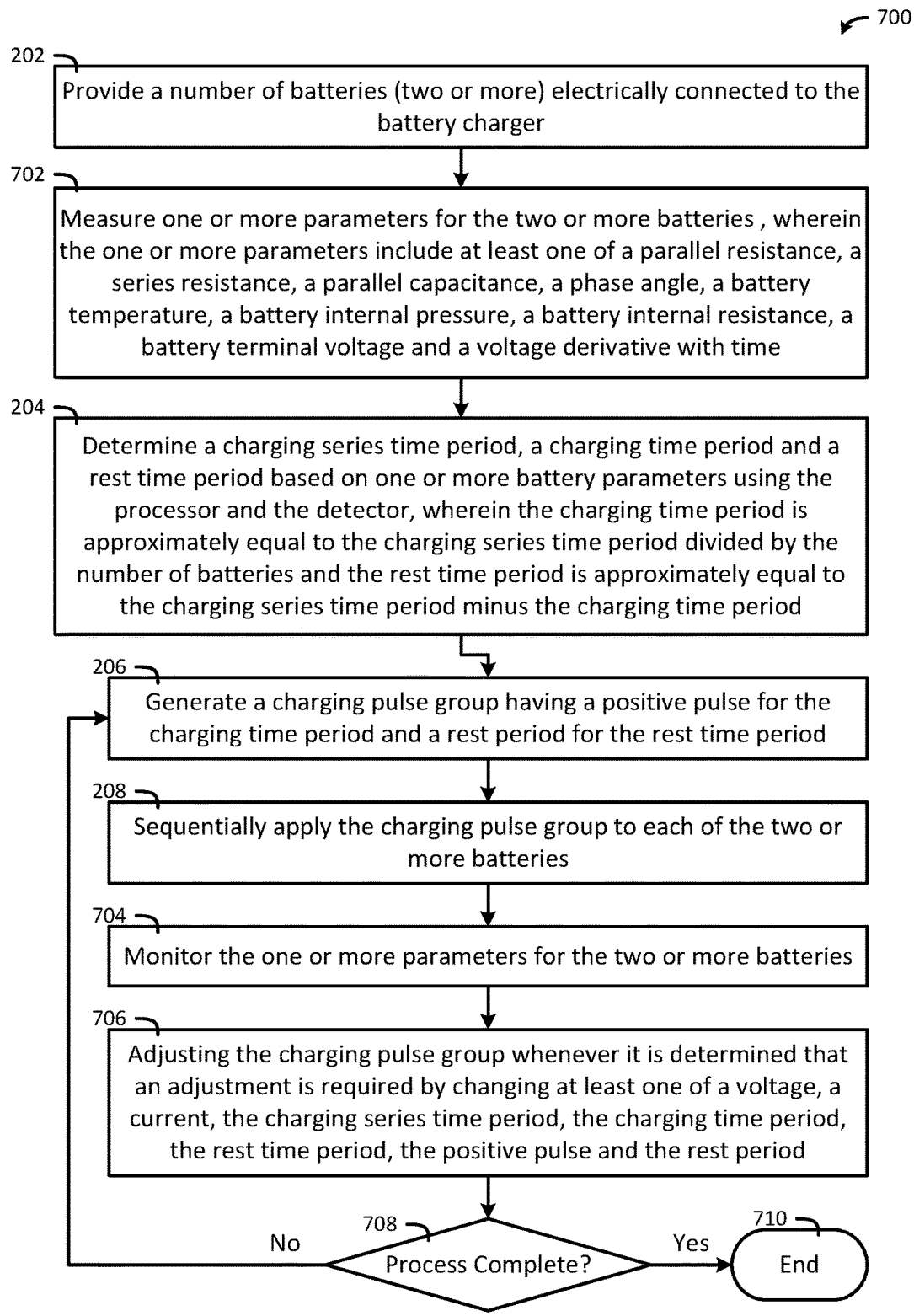
FIG. 7 is a flow chart of a method for charging two or more batteries with a battery charger in accordance with another embodiment of the present invention.

Now referring to FIG. 7, a method 700 for charging two or more batteries with a battery charger is shown. A number of batteries electrically connected to the battery charger are provided in block 202. The number of batteries is equal to or greater than two. The battery charger includes a pulse generator, a detector and a processor communicably coupled to the pulse generator and the detector (See e.g., FIG. 8). One or more parameters for the two or more batteries are measured in block 702. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. A charging series time period, a charging time period and a rest time period are determined based on one or more battery parameters using the processor and the detector in block 204. The charging time period is approximately equal to the charging series time period divided by the number of batteries and the rest time period is approximately equal to the charging series time period minus the charging time period. A charging pulse group having a positive pulse for the charging time period and a rest period for the rest time period is generated using the pulse generator in block 206. The charging pulse group is sequentially applied to each of the two or more batteries in block 208. The one or more parameters for the two or more batteries are monitored using the detector in block 704. The charging pulse group is adjusted in block 706 whenever it is determined that an adjustment is required using the processor. The adjustments to the charging pulse group may include changing at least one of a voltage, a current, the charging series time period, the charging time period, the rest time period, the positive pulse, the rest period, or other parameters. Note that the adjustments can be performed on each battery such that the charging pulse group includes a first charging pulse group for a first battery and a second charging pulse group for a second battery. If the process is complete, as determined in decision block 708, the process ends in block 710. The process may be complete when the two or more batteries are substantially charged, a specified charge level is obtained, or a specified charging time period has elapsed. If, however, the process is not complete, as determined in decision block 708, the process loops back to block 206 and repeats as previously described.

The step of providing the number of batteries electrically connected to the battery charger (step 202) may include the step of electrically connecting the two or more batteries to the battery charger. The method 200 may also include the steps of generating a discharge pulse using the pulse generator, applying the discharge pulse to each of the two or more batteries, and detecting the one or more battery parameters using the detector. As previously described, the step of generating the charging pulse group may further include a negative or discharge pulse during the rest time period.

Figure 8:
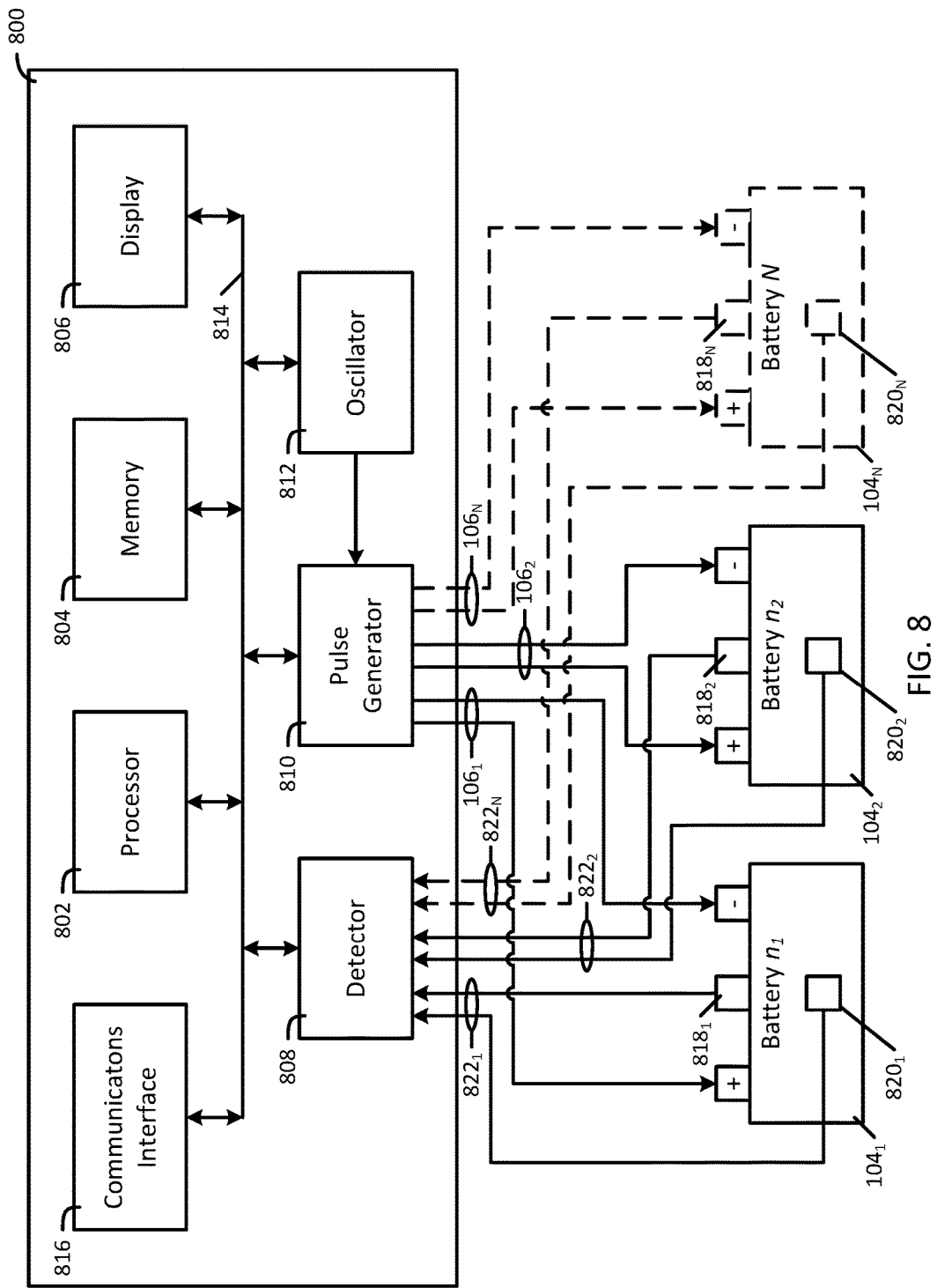
FIG. 8 is a block diagram of a charging system in accordance with another embodiment of the present invention.

Referring now to FIG. 8, a block diagram of a battery charger 800 in accordance with one embodiment of the present invention is shown. The battery charger 800 includes a processor 802, a memory 804, a display 806, a detector 808, a pulse generator 810 and an oscillator 812 communicably coupled to one another by one or more communication buses 814. Note that the oscillator 812 may be part of or integrated into the pulse generator 810. The battery charger 800 may include a communications interface 816 (wired, wireless, optical, etc.) that can be used to communicably couple the battery charger 800 to other local or remote devices or systems. The battery charger 800 is electrically connected to a number of batteries (N) where N>=2, represented by battery $n_1$, battery $n_2$ and battery N. The batteries $104_1$, $104_2$ and $104_N$ can be electrically connected to the pulse generator 810 by any suitable means $106_1$, $106_2$ and $106_N$, such as wires, leads, plugs, etc. Likewise one or more sensors (e.g., temperature sensor $818_1$, $818_2$ and $818_N$, pressure sensor $820_1$, $820_2$ and $820_N$, etc.) associated with the batteries $104_1$, $104_2$ and $104_N$ can be electrically connected to the detector 808 by any suitable means $822_1$, $822_2$ and $822_N$, such as wires, leads, plugs, etc. The battery charger 800 is configured to preform one or more of the methods described above in reference to FIGS. 2 and 7.

For example, the pulse generator 810 is configured to generate a charging pulse group having a positive pulse for a charging time period and a rest period for a rest time period and sequentially apply the charging pulse group to each of the two or more batteries $104_1$, $104_2$ and $104_N$. The detector 808 is configured to monitor one or more parameters for the two or more batteries $104_1$, $104_2$ and $104_N$. The processor 802 is configured to determine the charging series time period, the charging time period and the rest time period based on the one or more battery parameters, wherein the charging time period is approximately equal to the charging series time period divided by a number of batteries (N) comprising the two or more batteries and the rest time period is approximately equal to the charging series time period minus the charging time period. The processor 802 is further configured to determine whether to adjust the charging pulse group for the two or more batteries $104_1$, $104_2$ and $104_N$. As previously described, the step of generating the charging pulse group may further include a negative or discharge pulse during the rest time period.

The detector 808 can be further configured to measure the one or more parameters for the two or more batteries $104_1$, $104_2$ and $104_N$. The one or more battery parameters may include at least one of a parallel resistance, a series resistance, a parallel capacitance, a phase angle, a battery temperature, a battery internal pressure, a battery internal resistance, a battery terminal voltage and a voltage derivative with time. The processor 802 can be further configured to adjust the charging pulse group for the two or more batteries $104_1$, $104_2$ and $104_N$ by changing at least one of a voltage, a current, the charging series time period, the charging time period, the rest time period, the positive pulse and the rest period. The charging pulse can be adjusted for each battery such that the charging pulse group comprises a first charging pulse group for a first battery and a second charging pulse group for a second battery. The processor 802 can be further configured to charge the two or more batteries $104_1$, $104_2$ and $104_N$ until the two or more batteries are substantially charged, a specified charge level is obtained, or a specified charging time period has elapsed.

The state of the art for charging batteries already includes the electronic components necessary to switch the charge pulse and other actions between the batteries that are simultaneously charged, without a significant increase in the cost of the charger, enabling one charger to provide the full performance of two or more chargers for virtually the same price as one charger. For example, the battery charger in accordance with the present invention may include any of the features and processes described in U.S. Pat. Nos.

6,094,033 and 6,229,285, the entire contents of which are hereby incorporated by reference in their entirety.

The maximum output of a first prototype was 16.6 kilowatts variable from 0 to 830 amps and 0 to 20 volts to test charging of batteries for small portable devices and for small vehicles. The maximum output of our second prototype is 102.4 kilowatts. The transformer has two taps, providing outputs of 0 to 1280 amps and 0 to 512 volts for passenger vehicles whose lithium ion battery packs have hundreds of volts, and providing outputs of 0 to 200 amps and 0 to 80 volts for industrial vehicles whose lead acid batteries and packs have dozens of volts. The second prototype has been pilot tested at commercial locations.

Below are the combined test results, which were achieved even before the automated battery monitoring aspects of the patent are implemented:

| Test | Battery | Chemistry | Application |
|---|---|---|---|
| 1 | Thundersky 3.2 V, 60 Ah | Lithium Iron Phosphate | Cars & Devices, such as Power Tools, etc. |
| 2 | Panasonic 18650 3.6 V, 3.1 Ah | Lithium Cobalt Oxide | Cell Phones, Laptops and Tesla Cars |
| 3 | Trojan 24TMX 12 V, 85 Ah | Flooded Lead Acid | Small Electric Vehicles |
| 4 | Trojan T-105 6 V, 225 Ah | Flooded Lead Acid | Electric Vehicles |
| 5 | Exide GNB 48 v, 700 Ah | Flooded Lead Acid | Forklift Trucks |

| Test | Charge Range | Time | Temp | Mfg Max Safe Temp | Normal Times for Slow and Fast Charges |
|---|---|---|---|---|---|
| 1 | 20 to 80% | 12 min | 42° C. | 85° C. | Slow: 3 hrs |
|   | 20 to 100% | 16 min | 46° C. |   | Fast: 30 to 60 min |
|   | 0 to 100% | 19 min | 46° C. |   | (20 to 80%) |
| 2 | 20 to 80% | 20 min | 42° C. | 50° C. | Slow: 3 hrs |
|   | 20 to 100% | 28 min | 47° C. |   | Fast: 40 to 60 min |
|   |   |   |   |   | (20 to 80%) |
| 3 | 20 to 100% | 31 min | 49° C. | 49° C. | Slow: 8 hrs |
| 4 | 20 to 100% | 68 min | 44° C. | 49° C. | Fast: 2 to 3.5 hrs |
| 5 | 20 to 80% | 90 min | 48° C. | 60° C. |   |
|   | 20 to 100% | 2 hrs | 55° C. |   |   |

Other predetermined battery parameters, such equivalent circuit capacitance and resistance, electrochemical overcharge, maximum battery temperature, and maximum battery internal pressure, among others, can be compared with monitored values during the battery charging process to control the charging signal in order to continually altering the charge algorithm as the charge proceeds.

Just as two or more batteries can be charged simultaneously as described above, two or more cells within a battery that has a battery management system (BMS) can also be charged simultaneously. For example, half of the cells could receive a charge pulse while the other half are in a rest period or sending a discharge pulse. The advantage is that the amp hours required to charge the battery would be about half of what would otherwise be required, thereby reducing the cost of the charger, especially for large batteries. As a result, all of the foregoing examples of methods and systems are applicable to charging two or more cells within a battery by changing the term "battery" to "battery cell".

Accordingly, the present invention also provides a method for charging two or more cells within a battery with a battery charger by providing the battery having a number of cells electrically connected to the battery charger, determining a charging series time period, a charging time period and a rest time period based on one or more cell parameters using the processor and the detector, generating a charging pulse group having a positive pulse for the charging time period and a rest period for the rest time period using the pulse generator, sequentially applying the charging pulse group to each of the two or more cells, and monitoring the one or more parameters for the two or more cells and determining whether to adjust the charging pulse group for the two or more cells using the processor and the detector. The number of cells includes the two or more cells, and the battery charger includes a pulse generator, a detector and a processor communicably coupled to the pulse generator and the detector. The charging time period is approximately equal to the charging series time period divided by the number of cells and the rest time period is approximately equal to the charging series time period minus the charging time period.

In addition, the present invention provides a battery charger for two or more cells within a battery that includes a pulse generator configured to generate a charging pulse group having a positive pulse for a charging time period and a rest period for a rest time period and sequentially apply the charging pulse group to each of the two or more cells, a detector configured to monitor one or more parameters for the two or more batteries, and a processor communicably coupled to the pulse generator and the detector. The processor is configured to determine the charging series time period, the charging time period and the rest time period based on the one or more cell parameters, wherein the charging time period is approximately equal to the charging series time period divided by a number of cells comprising the two or more cells and the rest time period is approximately equal to the charging series time period minus the charging time period. The processor is further configured to determine whether to adjust the charging pulse group for the two or more cells.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not that particular function is activated, turned on, or unlocked, as long as that apparatus, system, or component is so adapted, arranged, capable, configured, enabled, operable, or operative.

What is claimed is:

1. A method for charging two or more batteries with a battery charger, comprising the steps of:
   providing a number of batteries electrically connected to the battery charger, wherein the number of batteries comprises the two or more batteries, and the battery charger comprises a pulse generator, a detector and a processor communicably coupled to the pulse generator and the detector;
   determining a charging series time period, a charging time period and a rest time period based on one or more battery parameters using the processor and the detector, wherein the charging time period is approximately equal to the charging series time period divided by the number of batteries and the rest time period is approximately equal to the charging series time period minus the charging time period;
   generating a charging pulse group having a positive pulse for the charging time period and a rest period for the rest time period using the pulse generator;
   sequentially applying the charging pulse group to each of the two or more batteries such that the positive pulse is only provided to one of the batteries at a time; and
   monitoring the one or more parameters for the two or more batteries and determining whether to adjust the charging pulse group for the two or more batteries using the processor and the detector.

2. The method as recited in claim 1, further comprising the step of measuring the one or more parameters for the two or more batteries, wherein the one or more battery parameters comprise at least one of a parallel resistance, a series resistance, a parallel capacitance, a phase angle, a battery temperature, a battery internal pressure, a battery internal resistance, a battery terminal voltage and a voltage derivative with time.

3. The method as recited in claim 1, wherein the step of generating the charging pulse group further comprises a negative pulse during the rest time period.

4. The method as recited in claim 3, wherein the negative pulse immediately precedes the positive pulse.

5. The method as recited in claim 3, wherein the negative pulse does not immediately follow the positive pulse and does not immediately precede the positive pulse.

6. The method as recited in claim 1, wherein the step of providing the number of batteries electrically connected to the battery charger comprises the step of electrically connecting the two or more batteries to the battery charger.

7. The method as recited in claim 1, further comprising the steps of:
   generating a discharge pulse using the pulse generator;
   applying the discharge pulse to each of the two or more batteries; and
   detecting the one or more battery parameters using the detector.

8. The method as recited in claim 1, wherein the monitoring step further comprises the step of adjusting the charging pulse group for the two or more batteries using the processor and the detector by changing at least one of a voltage, a current, the charging series time period, the charging time period, the rest time period, the positive pulse and the rest period.

9. The method as recited in claim 8, wherein the adjusting step is performed on each battery such that the charging pulse group comprises a first charging pulse group for a first battery and a second charging pulse group for a second battery.

10. The method as recited in claim 8, wherein the generating step, sequentially applying step, monitoring step and the adjusting step are repeated until the two or more batteries are substantially charged, a specified charge level is obtained, or a specified charging time period has elapsed.

11. A method for charging two or more batteries with a battery charger, comprising the steps of:
    providing a number of batteries electrically connected to the battery charger, wherein the number of batteries comprises the two or more batteries, and the battery charger comprises a pulse generator, a detector and a processor communicably coupled to the pulse generator and the detector;
    measuring one or more parameters for the two or more batteries, wherein the one or more battery parameters comprise at least one of a parallel resistance, a series resistance, a parallel capacitance, a phase angle, a battery temperature, a battery internal pressure, a battery internal resistance, a battery terminal voltage and a voltage derivative with time;
    determining a charging series time period, a charging time period and a rest time period based on the one or more battery parameters using the processor and the detector, wherein the charging time period is approximately equal to the charging series time period divided by the number of batteries and the rest time period is approximately equal to the charging series time period minus the charging time period;
    generating a charging pulse group having a positive pulse for the charging time period and a rest period for the rest time period using the pulse generator;
    sequentially applying the charging pulse group to each of the two or more batteries such that the positive pulse is only provided to one of the batteries at a time;
    monitoring the one or more parameters for the two or more batteries using the detector;
    adjusting the charging pulse group whenever the processor determines that an adjustment is required by changing at least one of a voltage, a current, the charging series time period, the charging time period, the rest time period, the positive pulse and the rest period; and
    repeating the generating step, the sequentially applying step, the monitoring step and the adjusting step until the two or more batteries are substantially charged, a specified charge level is obtained, or a specified charging time period has elapsed.

12. The method as recited in claim 11, wherein the step of generating the charging pulse group further comprises a negative pulse during the rest time period.

13. The method as recited in claim 12, wherein the negative pulse immediately precedes the positive pulse.

14. The method as recited in claim 12, wherein the negative pulse does not immediately follow the positive pulse and does not immediately precede the positive pulse.

15. The method as recited in claim 11, wherein the step of providing the number of batteries electrically connected to the battery charger comprises the step of electrically connecting the two or more batteries to the battery charger.

16. The method as recited in claim 11, further comprising the steps of:
    generating a discharge pulse using the pulse generator;
    applying the discharge pulse to each of the two or more batteries; and detecting the one or more battery parameters using the detector.

17. The method as recited in claim 11, wherein the adjusting step is performed on each battery such that the charging pulse group comprises a first charging pulse group for a first battery and a second charging pulse group for a second battery.

18. A battery charger for two or more batteries, comprising:
a pulse generator configured to generate a charging pulse group having a positive pulse for a charging time period and a rest period for a rest time period and sequentially apply the charging pulse group to each of the two or more batteries such that the positive pulse is only provided to one of the batteries at a time;
a detector configured to monitor one or more parameters for the two or more batteries;
a processor communicably coupled to the pulse generator and the detector, the processor configured to determine the charging series time period, the charging time period and the rest time period based on the one or more battery parameters, wherein the charging time period is approximately equal to the charging series time period divided by a number of batteries comprising the two or more batteries and the rest time period is approximately equal to the charging series time period minus the charging time period; and
the processor is further configured to determine whether to adjust the charging pulse group for the two or more batteries.

19. The battery charger as recited in claim 18, wherein the detector is further configured to measure the one or more parameters for the two or more batteries, wherein the one or more battery parameters comprise at least one of a parallel resistance, a series resistance, a parallel capacitance, a phase angle, a battery temperature, a battery internal pressure, a battery internal resistance, a battery terminal voltage and a voltage derivative with time.

20. The battery charger as recited in claim 18, wherein the charging pulse group further comprises a negative pulse during the rest time period.

21. The battery charger as recited in claim 20, wherein the negative pulse immediately precedes the positive pulse.

22. The battery charger as recited in claim 20, wherein the negative pulse does not immediately follow the positive pulse and does not immediately precede the positive pulse.

23. The battery charger as recited in claim 18, wherein the pulse generator is further configured to generating a discharge pulse and apply the discharge pulse to each of the two or more batteries.

24. The battery charger as recited in claim 18, wherein the processor is further configured to adjust the charging pulse group for the two or more batteries using the processor and the detector by changing at least one of a voltage, a current, the charging series time period, the charging time period, the rest time period, the positive pulse and the rest period.

25. The battery charger as recited in claim 24, wherein the charging pulse is adjusted for each battery such that the charging pulse group comprises a first charging pulse group for a first battery and a second charging pulse group for a second battery.

26. The battery charger as recited in claim 24, wherein the processor is configured to charge the two or more batteries until the two or more batteries are substantially charged, a specified charge level is obtained, or a specified charging time period has elapsed.

27. A method for charging two or more cells within a battery with a battery charger, comprising the steps of:
providing the battery having a number of cells electrically connected to the battery charger, wherein the number of cells comprises the two or more cells, and the battery charger comprises a pulse generator, a detector and a processor communicably coupled to the pulse generator and the detector;
determining a charging series time period, a charging time period and a rest time period based on one or more cell parameters using the processor and the detector, wherein the charging time period is approximately equal to the charging series time period divided by the number of cells and the rest time period is approximately equal to the charging series time period minus the charging time period;
generating a charging pulse group having a positive pulse for the charging time period and a rest period for the rest time period using the pulse generator;
sequentially applying the charging pulse group to each of the two or more cells such that the positive pulse is only provided to one of the cells at a time;
monitoring the one or more parameters for the two or more cells and determining whether to adjust the charging pulse group for the two or more cells using the processor and the detector.

28. A battery charger for two or more cells within a battery, comprising:
a pulse generator configured to generate a charging pulse group having a positive pulse for a charging time period and a rest period for a rest time period and sequentially apply the charging pulse group to each of the two or more cells such that the positive pulse is only provided to one of the cells at a time;
a detector configured to monitor one or more parameters for the two or more batteries;
a processor communicably coupled to the pulse generator and the detector, the processor configured to determine the charging series time period, the charging time period and the rest time period based on the one or more cell parameters, wherein the charging time period is approximately equal to the charging series time period divided by a number of cells comprising the two or more cells and the rest time period is approximately equal to the charging series time period minus the charging time period; and
the processor is further configured to determine whether to adjust the charging pulse group for the two or more cells.

* * * * *